(12) United States Patent
Daenzer et al.

(10) Patent No.: US 10,197,090 B2
(45) Date of Patent: Feb. 5, 2019

(54) ROLLING ELEMENT INTERMEDIATE SHAFT ASSEMBLY

(71) Applicant: STEERING SOLUTIONS IP HOLDING CORPORATION, Saginaw, MI (US)

(72) Inventors: Troy A. Daenzer, Reese, MI (US); Daniel C. Simon, Freeland, MI (US); Brian J. Magnus, Frankenmuth, MI (US); Patrik M. Ryne, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 166 days.

(21) Appl. No.: 15/179,017

(22) Filed: Jun. 10, 2016

(65) Prior Publication Data

US 2016/0281768 A1    Sep. 29, 2016

Related U.S. Application Data

(62) Division of application No. 14/283,974, filed on May 21, 2014, now abandoned.

(Continued)

(51) Int. Cl.
*F16C 3/03* (2006.01)
*F16C 3/035* (2006.01)
(Continued)

(52) U.S. Cl.
CPC ............. *F16C 3/035* (2013.01); *B62D 1/16* (2013.01); *B62D 1/20* (2013.01); *F16C 29/04* (2013.01);
(Continued)

(58) Field of Classification Search
CPC ...... F16C 63/035; F16C 29/123; F16C 29/04; F16C 2326/24; F16D 3/065; Y10T 403/32483
(Continued)

(56) References Cited

U.S. PATENT DOCUMENTS 2,639,139 A    5/1953   Carlson
4,898,566 A *  2/1990   Hakansson ............. F16C 3/035
                                                        464/167

(Continued)

FOREIGN PATENT DOCUMENTS

DE    3730393 A1    1/1994
EP    1512607 A1    3/2005
(Continued)

OTHER PUBLICATIONS

English translation of First Office Action regarding related CN App. No. 201410312360.5; dated Feb. 19, 2016; 12 pgs.

(Continued)

*Primary Examiner* — Greg Binda
(74) *Attorney, Agent, or Firm* — Cantor Colburn LLP

(57) ABSTRACT

A rolling element intermediate shaft assembly includes a solid shaft having first and second ends. Also included is a tubular shaft configured to receive the first end, the tubular shaft having an inner wall with an axially extending groove formed therein, the axially extending groove having an inner surface. Further included is a wear plate having a bottom surface and an elastically deformable body having first and second ends, the body defining an axially extending channel, the body of the wear plate received in the tubular shaft groove. Yet further included is an outer surface of the body of the wear plate defining a gap between the wear plate and the axially extending groove of the tubular shaft, the gap reduced upon flexure of the wear plate. Also included is at (Continued)

least one ball bearing disposed within the wear plate channel between the wear plate and the solid shaft.

11 Claims, 3 Drawing Sheets

Related U.S. Application Data

(60) Provisional application No. 61/825,884, filed on May 21, 2013.

(51) Int. Cl.
*F16D 3/06* (2006.01)
*B62D 1/16* (2006.01)
*B62D 1/20* (2006.01)
*F16C 29/04* (2006.01)
*F16C 29/12* (2006.01)

(52) U.S. Cl.
CPC ............ *F16C 29/123* (2013.01); *F16D 3/065* (2013.01); *F16C 2326/24* (2013.01); *Y10T 29/4984* (2015.01)

(58) Field of Classification Search
USPC .............................................. 464/167; 384/54
See application file for complete search history.

(56) References Cited

U.S. PATENT DOCUMENTS

| | | | |
|---|---|---|---|
| 5,692,961 A | 12/1997 | Turner | |
| 6,343,993 B1 | 2/2002 | Duval et al. | |
| 6,474,868 B2 * | 11/2002 | Geyer | F16C 3/035 464/167 X |
| 7,322,607 B2 | 1/2008 | Yamada et al. | |
| 7,429,060 B2 | 9/2008 | Yamada et al. | |
| 8,157,659 B2 | 4/2012 | Kakutani et al. | |
| 2005/0257639 A1 | 11/2005 | Yamada | |
| 2014/0349772 A1 | 11/2014 | Binda | |
| 2016/0369835 A1 * | 12/2016 | Kurokawa | F16D 3/065 |

FOREIGN PATENT DOCUMENTS

| | | |
|---|---|---|
| EP | 1547903 A1 | 6/2005 |
| JP | 2007008286 A | 1/2007 |

OTHER PUBLICATIONS

European Search Report for EP Application No. 14169308.5 dated Aug. 12, 2014; 6 pages.
European Examination Report for application No. 14169308.5-1751 dated Aug. 3, 2017, 5 pages.
EP Office Action regarding related EP App. No. 14169308.5; dated Sep. 19, 2016; 5 pgs.

* cited by examiner

ROLLING ELEMENT INTERMEDIATE SHAFT ASSEMBLY

CROSS-REFERENCES TO RELATED APPLICATIONS

This patent application is a divisional application of U.S. patent application Ser. No. 14/283,974, filed May 21, 2014 (now abandoned), which claims priority to U.S. Provisional Patent Application Ser. No. 61/825,884 filed May 21, 2013, which is incorporated herein by reference in its entirety.

FIELD OF THE INVENTION

The present disclosure generally relates to shaft couplings and, more specifically, to intermediate shaft assemblies for vehicles.

BACKGROUND OF THE INVENTION

Intermediate shafts (I-shafts) are designed to be a component of torque transfer from a steering column to a steering gear. They may also allow axial movement while maintaining this ability to transfer torque. Some known I-shafts control the torsional rate and axial sliding force through clearance control and friction, and these I-shafts are commonly referred to as friction slider I-shafts.

Some know friction slider I-shafts are composed of a metal solid shaft with a plastic based coating sliding inside of a metal tube. Many of these friction sliders must maintain extremely tight tolerances. As a result, because cross-sections of these components vary by application, the plastic based coating that is placed over the metal solid shaft must be customized to fit the specific tube it will be positioned in. As such, this process is difficult to use and maintain on a mass production scale. Accordingly, it is desirable to provide an I-shaft with variable tolerances such that it may be used with various sized I-shaft components.

SUMMARY OF THE INVENTION

In one aspect, a rolling element intermediate shaft assembly includes a solid shaft having a first end and a second end. Also included is a tubular shaft configured to receive the first end of the solid shaft, the tubular shaft having an inner wall with an axially extending groove formed therein, the axially extending groove having an inner surface. Further included is a wear plate having a bottom surface and an elastically deformable body having a first end and a second end, the body defining an axially extending channel, the body of the wear plate received in the tubular shaft axially extending groove. Yet further included is an outer surface of the body of the wear plate defining a gap between the wear plate and the axially extending groove of the tubular shaft, the gap reduced upon flexure of the wear plate. Also included is at least one ball bearing disposed within the wear plate channel between the wear plate and the solid shaft.

In another aspect, a method of assembling a rolling element intermediate shaft assembly is provided. The method includes providing a solid shaft having a first end and a second end. Also included is providing a tubular shaft having an inner wall with an axially extending groove formed therein, the axially extending groove having an inner surface. Further included is providing a wear plate having a bottom surface and defining an axially extending channel. Yet further included is orienting the wear plate in the tubular shaft axially extending groove with a gap defined by the wear plate and the tubular shaft axially extending groove. Also included is inserting the solid shaft into the tubular shaft. Further included is inserting at least one ball bearing within the wear plate channel between the wear plate and the solid shaft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
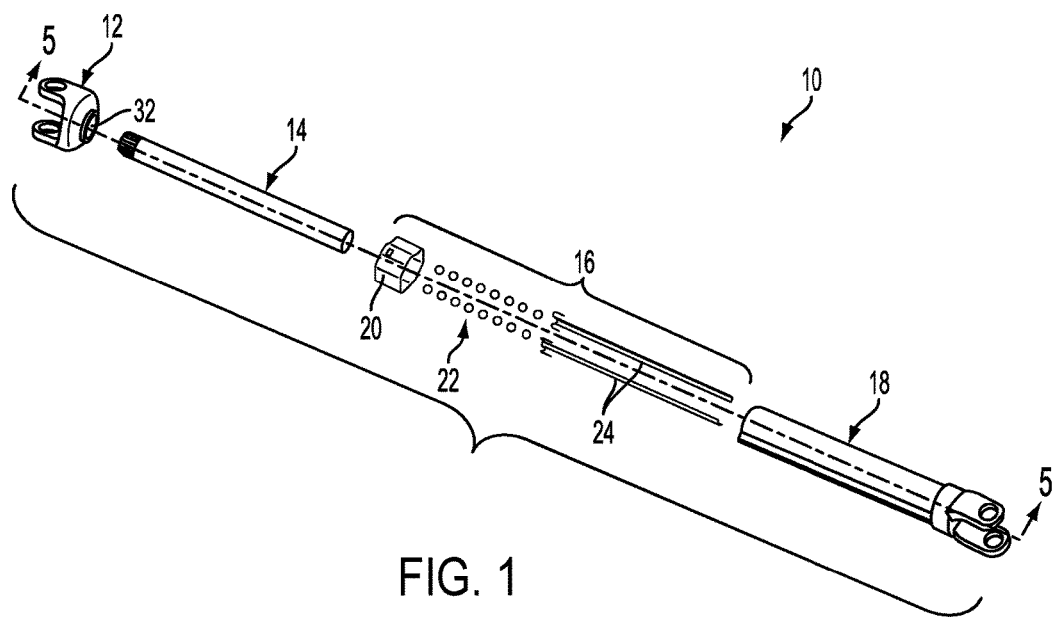
FIG. 1 is an exploded view of a rolling element I-shaft assembly in accordance with the invention.

Referring now to the Figures, where the invention will be described with reference to specific embodiments, without limiting same, FIG. 1 illustrates an exemplary rolling element intermediate shaft (I-shaft) assembly 10 that generally includes a yoke 12, a solid shaft 14, a roller assembly 16, and a tubular shaft 18. Roller assembly 16 includes a cap 20, ball bearings 22, and wear plates 24. In the exemplary embodiment, I-shaft assembly 10 is configured for use in a vehicle steering column assembly (not shown). However, shaft assembly 10 described herein may be used in any other suitable system.

Figure 2:
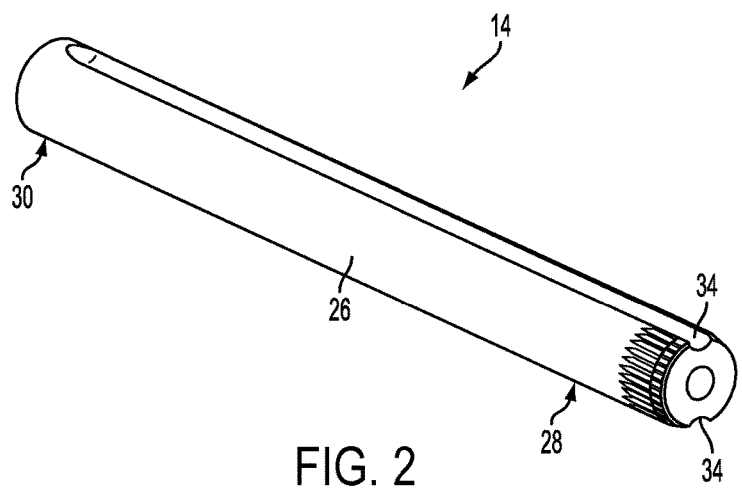
FIG. 2 is a perspective view of an exemplary solid shaft of the I-shaft assembly shown in FIG. 1.

FIG. 2 illustrates solid shaft 14, which generally includes a solid body 26 having a first end 28 and a second end 30. First end 28 is configured for insertion into an aperture 32 of yoke 12 (see FIG. 1) to facilitate coupling therebetween, and second end 30 is configured for insertion into tubular shaft 18. Solid body 26 includes grooves 34 extending axially along the length of solid shaft 14.

Figure 3:
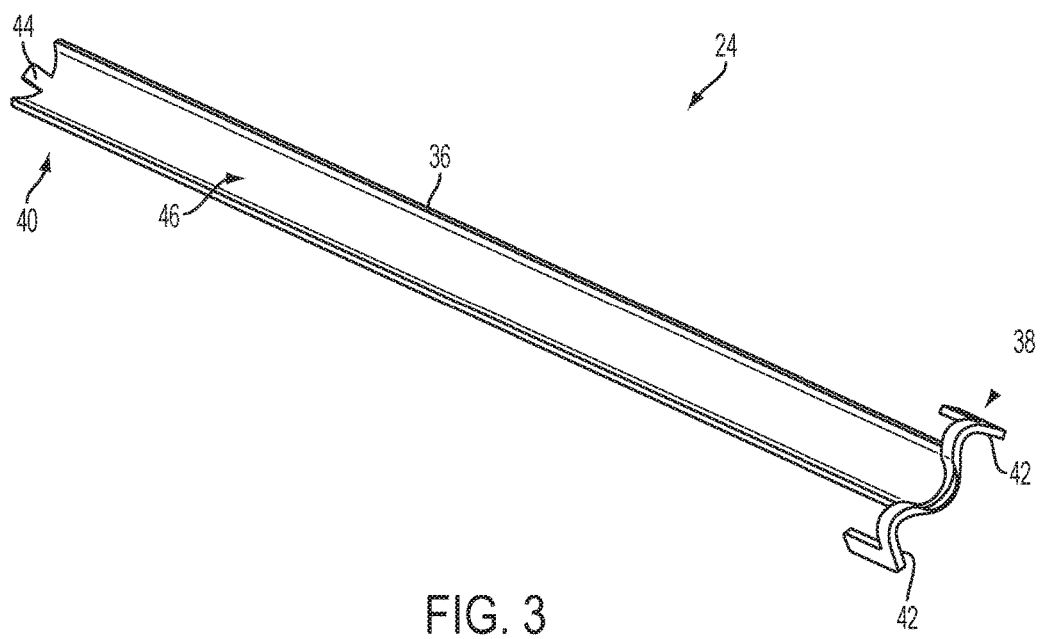
FIG. 3 is a perspective view of an exemplary wear plate of the I-shaft assembly shown in FIG. 1.

FIG. 3 illustrates wear plate 24, which generally includes a body 36 having a first end 38 and a second end 40. First end 38 includes arms 42 configured to facilitate holding wear plate 24 in position within tubular shaft 18 (e.g., arms 42 hook on tubular shaft 18), and second end 40 includes a tab 44 configured to facilitate preventing ball bearings 22 from rolling out of grooves 34 if solid shaft 14 is extended past wear plates 24. Wear plate body 36 defines an axially extending track or channel 46 that is configured to receive ball bearings 22, as is described herein in more detail. Wear plate first end 38 is configured to be inserted into cap 20, and wear plate second end 40 is configured to be inserted into tubular shaft 18. Wear plate 24 is of a material capable of elastically deforming within tubular shaft grooves 54 in response to a transverse force directed from ball bearings 22.

Figure 4:
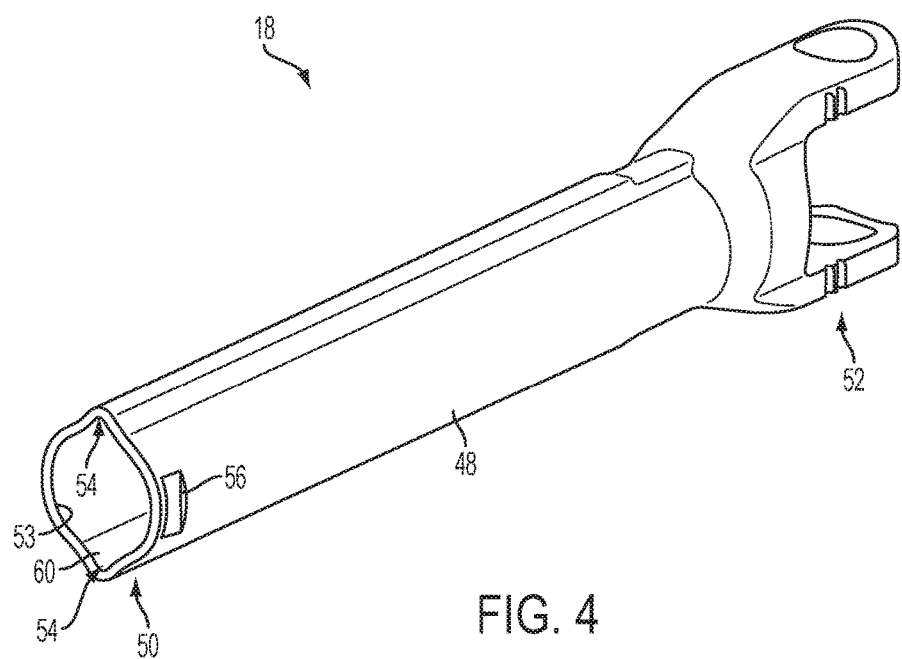
FIG. 4 is a perspective view of an exemplary tubular shaft of the I-shaft assembly shown in FIG. 1.

FIG. 4 illustrates tubular shaft 18, which generally includes a tubular body 48 having an open end 50 and a yoke end 52. Open end 50 is configured to receive roller assembly 16 and solid shaft second end 30, and yoke end 52 is configured to couple to the steering column assembly. Tubular body 48 includes an inner wall 53 having axially extending grooves 54 formed therein. Grooves 54 are configured to receive wear plates 24 at least partially therein, as is describe herein in more detail. Tubular body 48 also includes one or more slot 56 configured to retain cap 20 on tubular shaft open end 50. However, cap 20 may be coupled to tubular shaft 18 in any suitable manner.

Figure 5:
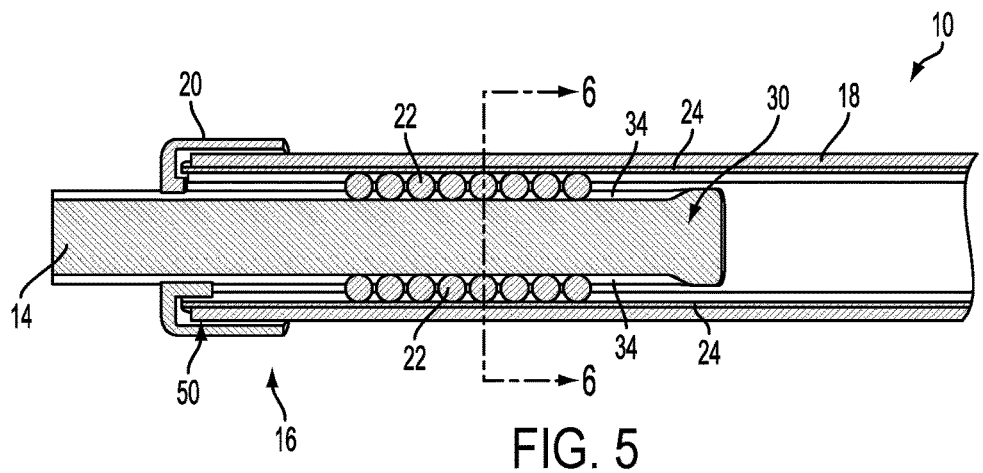
FIG. 5 is a cross-sectional view of a portion of the I-shaft assembly shown in FIG. 1, after assembly, and taken along line 5-5.
Figure 6:
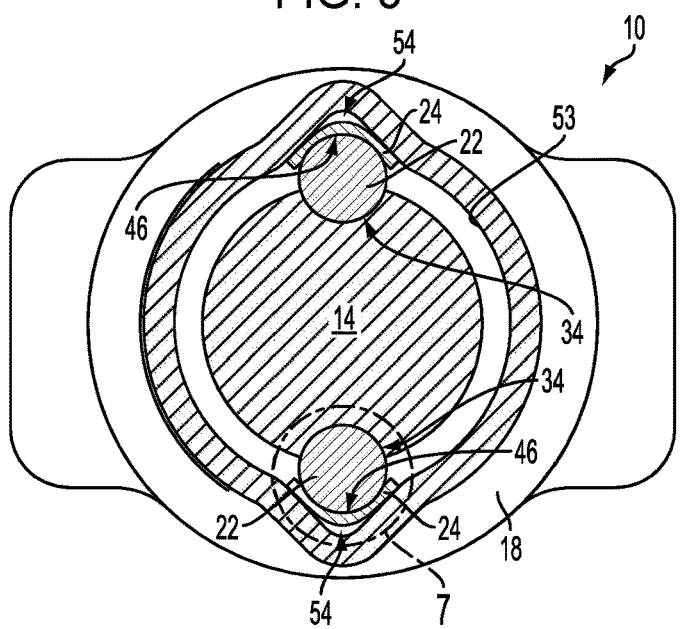
FIG. 6 is a sectional view of the I-shaft assembly shown in FIG. 5, and taken along line 6-6.
Figure 7:
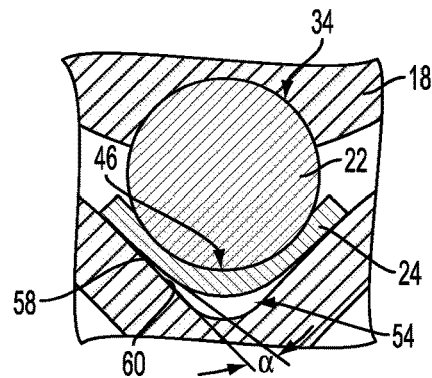
FIG. 7 is an enlarged view of a portion of the I-shaft assembly shown in FIG. 6, and taken along section 7.

With reference to FIGS. 5-7, assembly of I-shaft assembly 10 includes providing yoke 12, solid shaft 14, roller assembly 16, and tubular shaft 18. Wear plates 24 are inserted into tubular shaft open end 50 and are each oriented within one of tubular shaft grooves 54 such that bottom surfaces 58 of wear plates 24 are facing inner surfaces 60 of grooves 54 (see FIGS. 6 and 7). As shown in FIG. 7, wear plate 24 and/or groove 54 are formed such that bottom surface 58 is oriented with respect to inner surface 60 at an angle 'a' that is transverse to the axially extending grooves 54. In the exemplary embodiment, angle 'a' is less than or equal to 10°. However, angle 'a' may be any suitable angle that enables I-shaft assembly 10 to function as described herein. The offset between the surfaces 58, 60 due to angle 'a' facilitates a flexible or elastic interface between wear plate 24 and tubular shaft 18, which prevents or eliminates the need for exact matched pairs and tight tolerances between components 14, 16, 18 of I-shaft assembly 10. As such, the offset facilitates translational movement while minimizing fatigue of the wear plate and preventing movement of wear plates 24 when a torque is applies to assembly 10. Additionally, as described herein, the type of material used to fabricate wear plate 24, as well as the thickness of the material, may be varied to provide a desired elasticity or flexibility for wear plate 24.

Solid shaft second end 30 is inserted into tubular shaft open end 50 and oriented such that grooves 34 are substantially aligned with wear plates channels 46. As illustrated in FIG. 6, grooves 34, wear plates 24, and grooves 54 are oriented approximately 180° from each other. However, grooves 34, wear plates 24, and grooves 54 may be oriented with respect to each other at any suitable angle that enables assembly 10 to function as described herein. Further, assembly 10 may include any number of sets of grooves 34, wear plates 24, and grooves 54. For example, assembly 10 may include three or four sets of grooves 34, wear plates 24, and grooves 54.

In the exemplary assembly, ball bearings 22 are subsequently inserted into the spaces or tracks formed between grooves 34 and channels 46. During insertion of ball bearings 22, wear plates 24 may flex to take up any tolerance of assembly 10 due to the offset orientation of wear plate bottom surfaces 58 and tubular shaft groove inner surfaces 60, as described above. Cap 20 is inserted over solid shaft 14 and is coupled to tubular shaft open end 50 (see FIG. 5), which facilitates securing ball bearings 22 within wear plate channels 46 and preventing foreign objects or contaminants from getting into tubular shaft 18 and hindering the operation of roller assembly 16. Yoke 12 may then be coupled to solid shaft first end 28 in any suitable manner (e.g., press-fitting, welding, etc.).

Described herein are systems and methods for a rolling element I-shaft assembly that includes a tubular shaft, a solid shaft, wear plates, and ball bearings. Grooves are formed in the solid shaft outer surface and the tubular shaft inner surface. The wear plates include channels and are oriented within the tubular shaft grooves proximate the solid shaft grooves to define tracks therebetween to receive the ball bearings. This allows translational motion between the shafts as the ball bearings travel axially down the tracks. The wear plates also allow for variations along the solid shaft and tubular shaft by providing a flexible interface between the described components due to an offset angle between the wear plates and the tubular shaft. Accordingly, a robust I-shaft assembly is provided that facilitates translational motion, does not require high tolerances, and maintains high torsional strength, durability, and stiffness.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rolling element intermediate shaft assembly comprising:
   a solid shaft having a first end and a second end;
   a tubular shaft configured to receive the first end of the solid shaft, the tubular shaft having an inner wall with an axially extending groove formed therein, the axially extending groove having an inner surface;
   a one-piece wear plate having a bottom surface and an elastically deformable body having a first end and a second end, the body defining an axially extending channel, the body of the wear plate received in the tubular shaft axially extending groove;
   an outer surface of the body of the wear plate defining a gap between the wear plate and the axially extending groove of the tubular shaft, the gap reduced upon flexure of the wear plate; and
   at least one ball bearing disposed within the wear plate channel between the wear plate and the solid shaft, and spaced from the tubular shaft by the wear plate.

2. The assembly of claim 1, further comprising:
   a second axially extending groove formed in the tubular shaft inner wall; and
   a second wear plate received in the tubular shaft second axially extending groove, wherein at least one ball bearing is disposed within the second wear plate channel between the second wear plate and the solid shaft.

3. The assembly of claim 2, wherein the axially extending groove and the second axially extending groove are oriented approximately 180° apart from each other.

4. The assembly of claim 3, wherein the wear plate and the second wear plate are oriented approximately 180° apart from each other.

5. The assembly of claim 1, wherein an offset angle is defined between the wear plate bottom surface and the tubular shaft groove inner surface.

6. The assembly of claim 5, wherein the offset angle that is transverse to the axially extending groove of about between 0° and 10°.

7. The assembly of claim 1, wherein the solid shaft includes an outer surface having an axially extending groove formed therein, wherein the at least one ball bearing is disposed within the wear plate channel and the solid shaft axially extending groove.

8. The assembly of 7, wherein the solid shaft includes a second axially extending groove formed therein.

9. The assembly of claim 8, wherein the solid shaft axially extending groove and the solid shaft second axially extending groove are oriented approximately 180° apart from each other.

10. The assembly of claim 1, further comprising a retainer cap coupled to the tubular shaft to facilitate retention of the at least one ball bearing within the tubular shaft.

11. The assembly of claim 1, further comprising a yoke coupled to the solid shaft second end, wherein the tubular shaft further includes a yoke end.

* * * * *